United States Patent [19]

Kurebayashi et al.

[11] Patent Number: 5,642,345
[45] Date of Patent: Jun. 24, 1997

[54] RECORDING/REPRODUCING APPARATUS INCLUDING FREQUENCY MODULATOR FOR FREQUENCY-MODULATING DIGITAL-MODULATED SIGNAL AND FREQUENCY DEMODULATOR FOR FREQUENCY-DEMODULATING SIGNAL TO OBTAIN DIGITAL-MODULATED SIGNAL

[75] Inventors: Masaaki Kurebayashi, Ebina; Nobuhiro Tokushuku, Yokohama; Makoto Miyamoto, Kanagawa-ken; Naomi Suzuki; Yoshihiko Noro, both of Yokohama, all of Japan

[73] Assignee: Hitachi, Ltd., Tokyo, Japan

[21] Appl. No.: 243,911

[22] Filed: May 17, 1994

[30] Foreign Application Priority Data

May 20, 1993 [JP] Japan .................. 5-118592

[51] Int. Cl.⁶ .................. G11B 7/00; H04N 5/76
[52] U.S. Cl. .................. 369/124; 386/126
[58] Field of Search .................. 369/124, 60, 62, 369/59; 360/27, 48, 9.1, 32, 29; 358/343, 342, 339, 341; 386/33, 34, 126

[56] References Cited

U.S. PATENT DOCUMENTS

| | | | |
|---|---|---|---|
| 3,909,512 | 9/1975 | Omori et al. | 358/342 |
| 5,062,007 | 10/1991 | Nakatsu et al. | 360/29 |
| 5,198,940 | 3/1993 | Nagasawa et al. | 360/32 |
| 5,400,315 | 3/1995 | Koishi et al. | 369/124 |
| 5,404,248 | 4/1995 | Shimoda et al. | 360/27 |

FOREIGN PATENT DOCUMENTS 64-88965  4/1989  Japan .

OTHER PUBLICATIONS

I. Kuroyanagi, editor, *Digital Communication Circuit*, pp. 246–248, published in 1990 by Sangyo Tosho (in Japanese), no month available.

Satoh, et al., Signal Characteristics of High Definition Video Discs, 1990, vol. 44, No. 10, pp. 1376–1382.

*Primary Examiner*—Tan Dinh
*Attorney, Agent, or Firm*—Antonelli, Terry, Stout & Kraus, LLP

[57] ABSTRACT

A recording apparatus includes a recording medium, a frequency modulator for conducting frequency modulation on a digital-modulated signal to generate a recording signal, and a recording unit for recording the recording signal on the recording medium.

2 Claims, 13 Drawing Sheets

F I G. 2
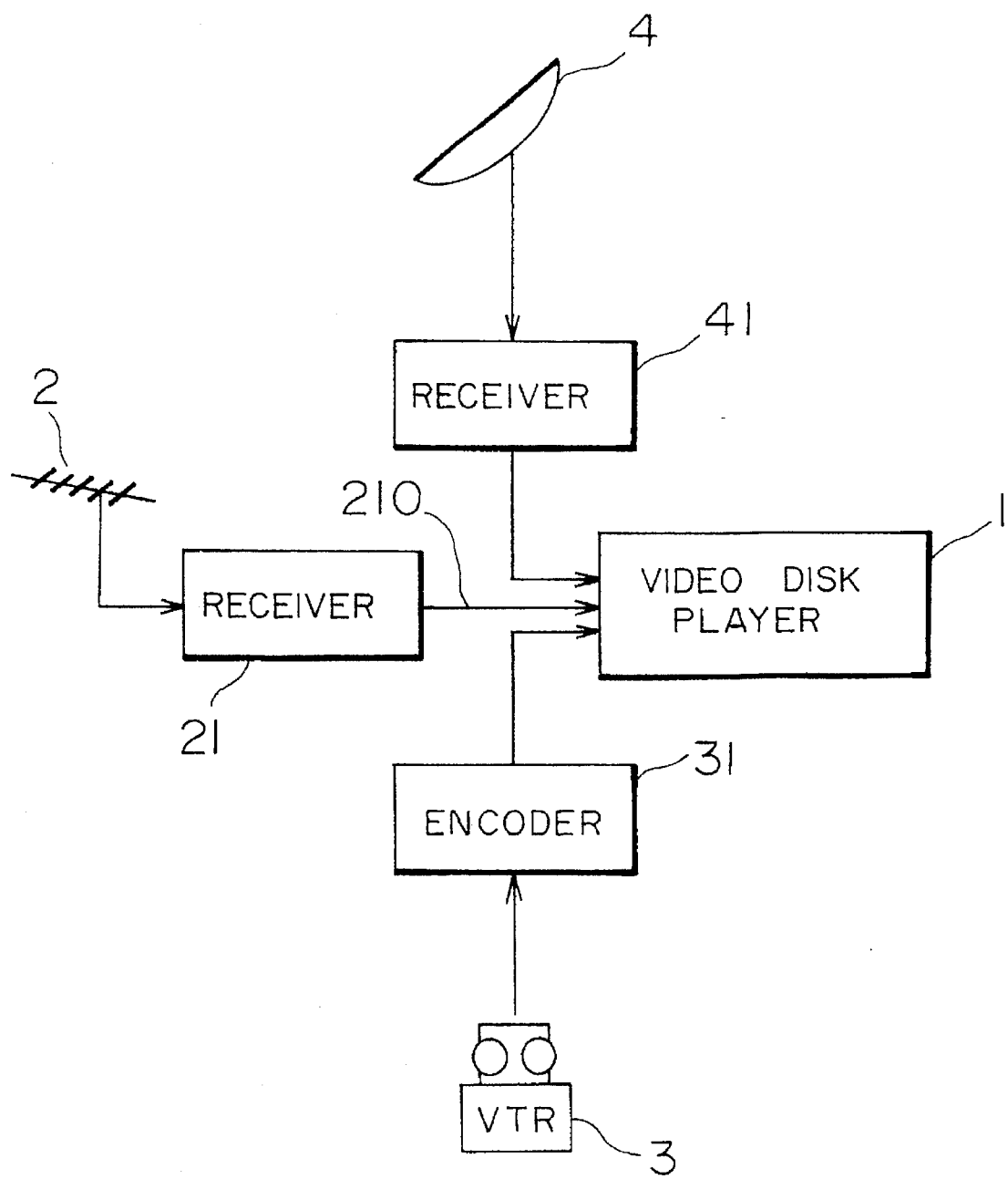

FIG. 7
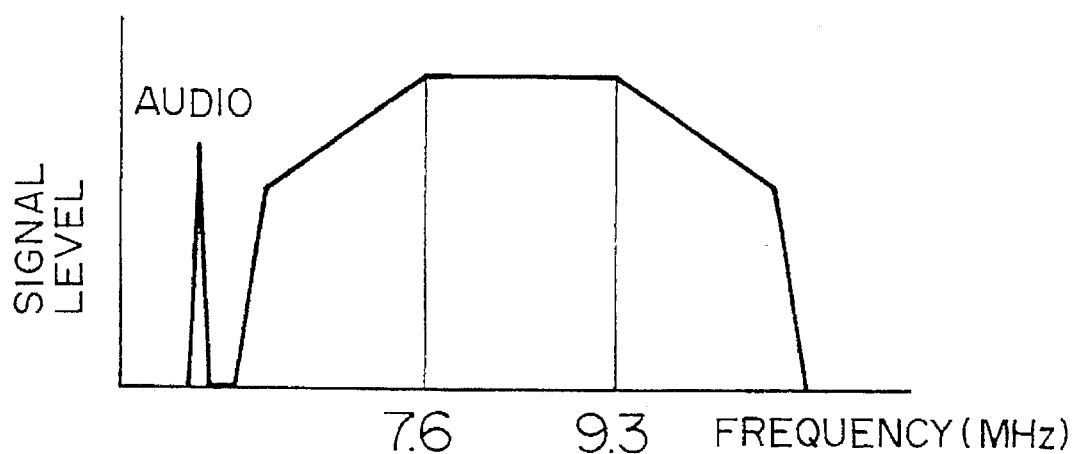
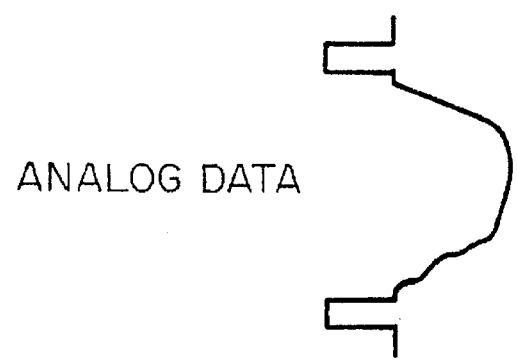
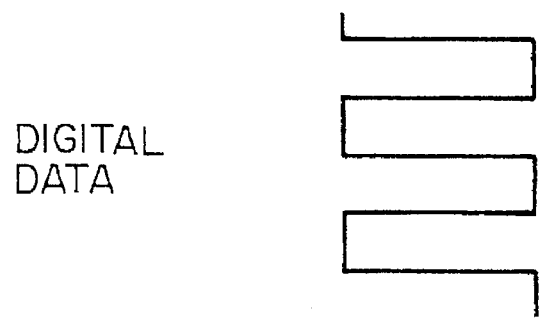

FIG. 12
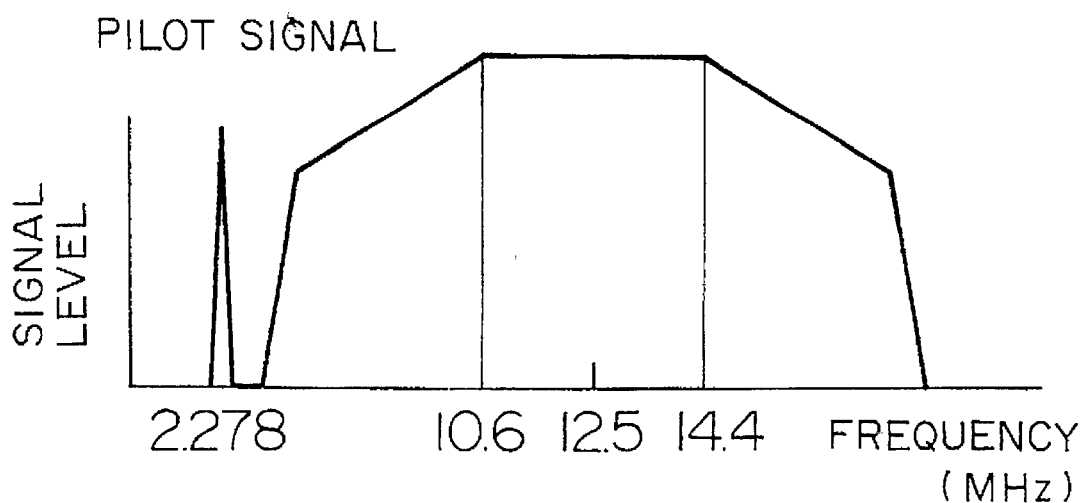
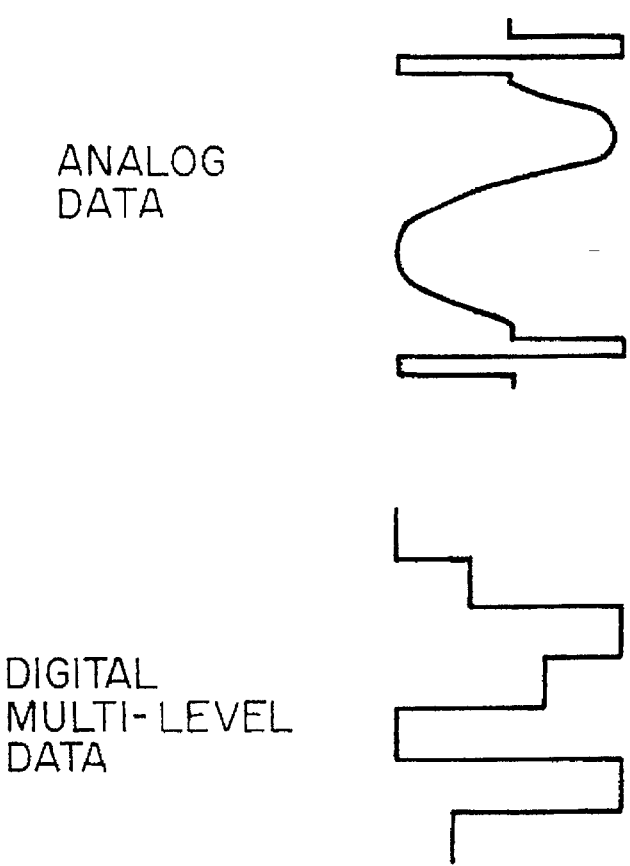

RECORDING/REPRODUCING APPARATUS INCLUDING FREQUENCY MODULATOR FOR FREQUENCY-MODULATING DIGITAL-MODULATED SIGNAL AND FREQUENCY DEMODULATOR FOR FREQUENCY-DEMODULATING SIGNAL TO OBTAIN DIGITAL-MODULATED SIGNAL

BACKGROUND OF THE INVENTION

The present invention relates to a recording or reproduction system for recording or reproducing information by using a recording medium, and in particular to a recording or reproducing system for recording digital signals with a high density.

As an example of a recording/reproducing system for recording/reproducing information, an optical disk system for recording/reproducing image information can be mentioned. As an example of image information, television signals can be mentioned. By the way, television signals commonly watched at the present time are analog signals of the NTSC system. They are handled in the form of analog signal except special cases such as business use. As a medium for recording/reproducing NTSC images, a video tape recorder (VTR) using magnetic tape or a laser disk (LD) using an optical disk is employed. Typically in these cases, analog image signals are recorded on a medium by using the frequency modulation method and mass production is performed by means of transfer.

On the other hand, as the speed of computers is increased, there have appeared such system that images are converted into digital signals and the digital signals are recorded on a medium. These images may be created on a computer or may be taken into a computer individually. In some cases, NTSC images taken in may be converted and taken in. Also the output may be sent to only a computer display. Alternatively, the output may be converted into NTSC signals so that it may be watched on an ordinary television screen. In general, the image information is recorded on a hard disk or a writable optical disk as digital data.

Furthermore, signals of high definition television (HDTV) attracting attention as future television are often recorded and reproduced in the form of digital data because they are often used for business use at the present time. On the other hand, MUSE signals created for domestic use of high definition television are analog signals and broadcasting is performed by using MUSE signals. Furthermore, optical disks having MUSE signals recorded thereon are manufactured as products. Such a technique has been announced in "Journal of the Institute of Television Engineers of Japan, Vol. 44, No. 10, pp. 1376–1382" as "Signal transmission characteristics of high definition video disk."

SUMMARY OF THE INVENTION

An object of the present invention is to provide a recording apparatus capable of recording digital signals with a high density.

Another object of the present invention is to provide a recording apparatus which has compatibility (interchangeability) between digital image recording and analog image recording and which can be reduced in size.

As described in "Background of the Invention," digital images are handled around a computer in increased cases and analog data and digital data are handled mixedly. Making a comparison of the same image information between digital and analog signals, digital signals need more information contents. (For example, when signals are recorded on a VTR, a method of conducting frequency modulation directly on a carrier wave by using digital signals is employed. In this case, digital signals need a longer tape length.) In recording digital image information, especially a moving picture on a disk, the recording time is reduced to approximately ½ to ¹⁄₁₀ as compared with that of analog signals. (In recording digital image information, a method of conducting frequency modulation on a carrier wave by using digital signals and recording modulated signals, or a method of directly associating presence and absence of a pit respectively with 0 and 1 of a digital signal is used.) In time of this extent, signals of a package medium such as a movie which has heretofore been supplied by using analog data cannot be recorded, resulting in a problem.

That is to say, an object of the present invention is to provide a recording system capable of recording digital signals with a high density, as described above.

Another problem will now be described. Conventional image information brings no inconvenience so long as it is used in an independent state such as in a a VTR, a LD, or a computer. As multimedia handling a large number of kinds of information simultaneously are increasingly used, however, images are handled on computers and digital data and analog data are mixedly present on the same medium. In such a case, independence of these image recording media causes inconvenience in many respects. In recording methods of these image recording media, there is no interchangeability between digital image recording and analog image recording although the same magnetic recording is used. For handling still pictures fed from a computer and analog images fed from a VTR or the like, therefore, two recording/reproducing apparatuses are needed although outputs are obtained on a common monitor TV set.

The simplest method for solving these problems is to provide two recording/reproducing systems, i.e., digital and analog recording/reproducing systems. By doing so, however, the number of parts is increased, resulting in a possibility of a large-sized apparatus. Furthermore, in some cases, there occurs a necessity of changing the characteristics of a medium between digital recording and analog recording depending upon the recording/reproducing condition. It is thus considered that this causes not only increase in the number of devices or apparatus size but also increase in the number of kinds of media, resulting in further confusion.

That is to say, another object of the present invention is to provide a recording system which has compatibility between digital image recording and analog image recording and which can be reduced in size, as described above.

In order to solve the above described problem, a recording system for recording information on a recording medium according to the present invention includes frequency modulation means for conducting frequency modulation on a digital-modulated signal to generate a recording signal and recording means for recording the recording signal on the recording medium.

In order to solve the second problem, the frequency modulation means accepts an analog image signal, conducts frequency modulation, and generates the recording signal, and the recording means records the recording signal.

In digital modulation, data can be multiplexed. By conducting digital modulation, therefore, digital signals are transformed into high-density data. Furthermore, if signals are left as they have been digital-modulated, the amplitude is not uniform and hence it is difficult to record the signals on an optical disk or the like. Therefore, frequency modulation is conducted in order to make the amplitude uniform and thereby make signals easily recordable on the optical disk. By doing so, it becomes possible to record and reproduce signals for a longer time as compared with the case where signals are recorded directly (i.e., a method of conducting frequency modulation directly on a carrier wave by using digital signals and recording modulated signals, or a method of directly associating 0 and 1 of digital signals respectively with presence and absence of a pit).

Furthermore, when digital-modulated signals are to be subjected to frequency modulation, a carrier wave used for analog image recording is used for recording. By doing so, signals recorded on the disk are substantially the same no matter whether signals are analog or digital and the same disk can be used. Furthermore, since modulation and demodulation circuits can be used in common, it becomes possible to use common circuits and reduce the size of the apparatus.

As apparent from the foregoing description, the present invention brings about the following effects. That is to say, by conducting frequency modulation on digital signals prior to recording, design can be made in the same way as conventional analog modulation and demodulation circuits and the same disk can also be used.

Furthermore, by conducting digital modulation and multi-value forming, high-density recording becomes possible and digital image data can be recorded and reproduced for a long time.

Furthermore, by making the carrier frequency used when digital data are subjected to frequency modulation the same as that for analog signals, interchange between the analog disk and the digital disk is facilitated. As a result, disks can be produced efficiently and small-sized recording/reproducing apparatuses can be produced. In addition, an effect that the user also can use disks without confusion is obtained.

BRIEF DESCRIPTION OF THE DRAWINGS

FIG. 2 is a block diagram of a recording system included in a recording/reproducing apparatus of the first embodiment;

FIG. 7 is a diagram for explaining frequency allocation conducted at the time of frequency modulation in the second embodiment;

FIG. 12 is a diagram for explaining frequency allocation conducted at the time of frequency modulation in the third embodiment;

DESCRIPTION OF THE PREFERRED EMBODIMENTS

Figure 1:
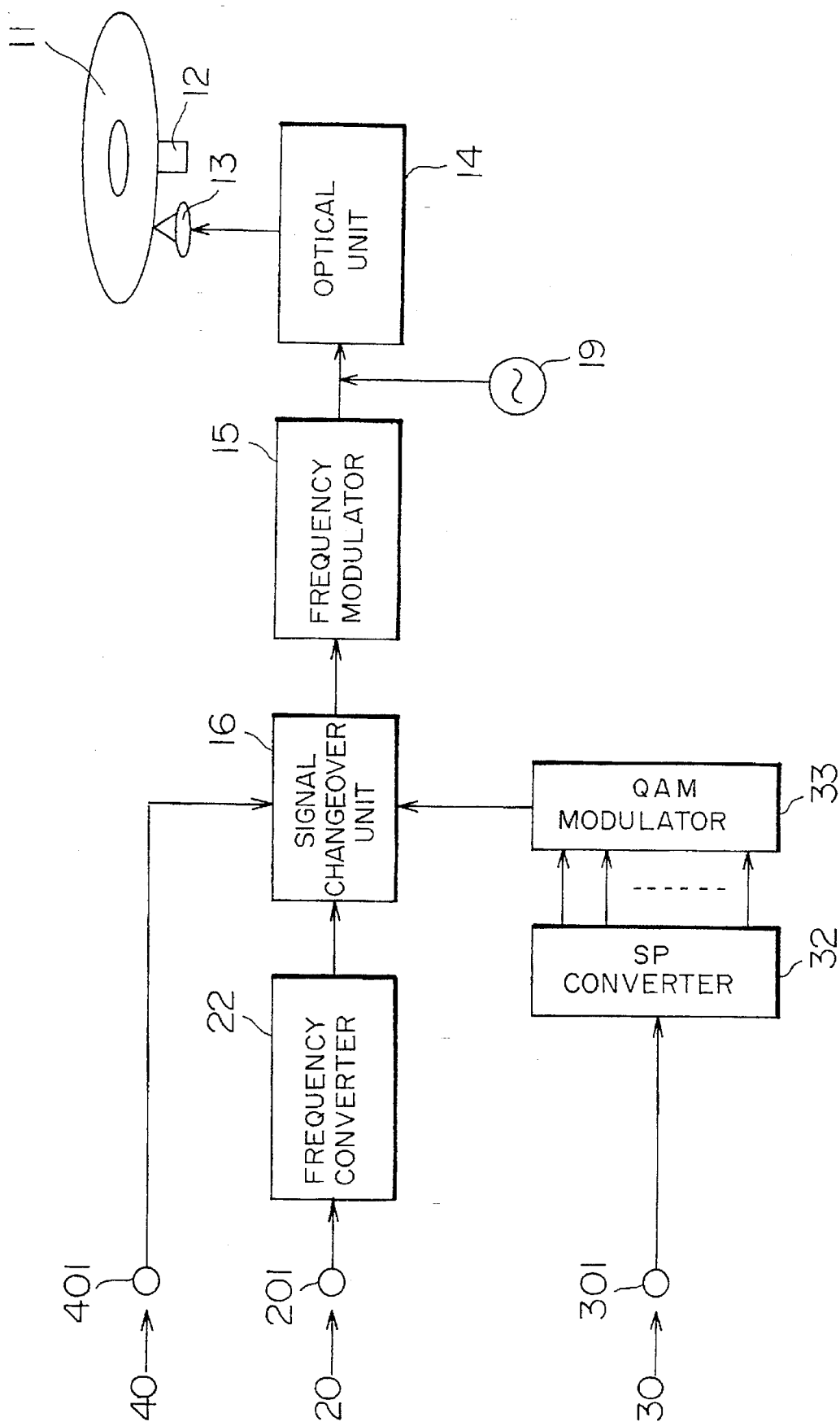
FIG. 1 is a block diagram of a portion of a recording system of a first embodiment according to the present invention, the portion being included in a player.

In the present embodiment, the above described problems of the conventional technique such as short recording time, large-sized apparatus, and confusion in handling are solved by conducting, on digital image signals as occasion demands, digital data transformation for multiplexing such as digital modulation or multi-value forming, and then recording transformed digital data by using the same carrier wave as that used for analog image recording and by using a frequency modulation method. By doing so, signals recorded on the disk are substantially the same no matter whether signals are analog or digital and the same disk can be used. It thus becomes possible to avoid confusion in handling. Furthermore, since modulation and demodulation circuits can be used in common, it becomes possible to use common circuits and reduce the size of the apparatus. Furthermore, by transforming digital data into data having a higher density, it becomes possible to record and reproduce signals for a longer time as compared with the case where signals are recorded directly.

That is to say, inputted data are recorded by using the frequency modulation method no matter whether the data are analog or digital. In case of analog data, the synchronizing signal, black level, and white level are associated with frequencies within a frequency range.

In case of digital data, the signal form is converted as occasion demands so that frequency modulation may be conducted. That is to say, if direct modulation is possible (in case the frequency of digital data is sufficiently lower than the carrier frequency used when the same frequency modulation as that of analog data is conducted) and compatibility is needed but digital data recording need not be conducted at a higher density, then such frequency modulation that 1 and 0 are associated with respective frequencies is conducted as digital modulation. Thereafter, the same frequency modulation as that of analog data is conducted.

Even if in this case digital modulation is not conducted and only the same frequency modulation as that of analog data is conducted, compatibility can be realized and size reduction is possible.

On the other hand, in case the frequency of digital data is higher than the carrier frequency used at the time of frequency modulation, direct modulation (such frequency modulation that 1 and 0 are associated with respective frequencies) cannot be conducted and hence multiplexed digital modulation or the like is conducted. Also in case high-density recording must be conducted, multiplexed digital modulation or the like is conducted. In accordance with the present invention, therefore, two methods are used.

In one of the two methods, digital signals are transmitted as amplitude and phase information of a carrier wave in multiplexed digital modulation. As representative examples, QPSK (quadrature phase shift keying) using phase information and QAM (quadrature amplitude modulation) using both amplitude and phase information can be mentioned. (A method for implementing QAM is described in "Digital communication circuit," edited by Isayoshi Kuroyanagi and published by Sangyo Tosho in 1990, pp. 246 to 248, for example.) Since this is a kind of multiplexed information transmission, an apparent transmission rate (baud rate) of digital signals can be reduced. Especially in QAM signals using amplitude information and phase information, the degree of its multiplexing becomes large, and hence signals can be recorded even in frequency modulation using a carrier wave used for disk recording. As for QAM, there are 16 QAM, 64 QAM, 256 QAM, for example. As the QAM has a larger numeral, more signals can be multiplexed.

In the other of the two methods, digital modulation is not conducted and multi-level (multi-valued) recording is conducted. It is difficult to directly record multi-valued information of the amplitude direction on an optical disk. Therefore, multi-level digital signals are subjected to frequency modulation and then recorded. In conventional digital data, two kinds of information, i.e., 1 and 0 are handled. In multi-level recording, a plurality of data such as 0, 1, 2 and 3 are used instead of conventional digital data having only 0 and 1. In case of four values, for example, information contents twice that of convention data can be sent by using four values 0, 1, 2 and 3 as data. By modulating this multi-valued information by using frequencies associated with respective values, recording becomes possible. Assuming that the carrier frequency for transmitting 0 is fc, for example, 1, 2 and 3 can be recorded by performing modulation to yield fc+fd, fc+2fd, and fc+3fd, respectively.

Furthermore, both the first and second methods finally lead to frequency modulation recording. Therefore, compatibility with respect to the conventional method of conducting frequency modulation on analog signals and recording them is facilitated.

A first embodiment of the present invention will now be described by referring to drawings. FIG. 2 shows a block diagram of a recording system included in a recording/reproducing apparatus. FIG. 1 shows a block diagram of a portion of the recording system which is included in a player. In the present embodiment, a write-once optical disk is used. The present system includes a video disk player 1, an antenna 4, a receiver 41, an antenna 2, a receiver 21, a digital VTR 3, and an encoder 31. The video disk player 1 includes a frequency converter 22, a serial-parallel converter 32, a QAM modulator 33, a signal changeover unit 16, a digital reference signal generator 19, an optical unit 14, an object lens 13, an optical disk 11, and a spindle motor 12.

The optical disk 11 is rotated on the spindle motor 12. Laser light emitted from the optical unit 14 including a laser drive circuit and a photodetector circuit is recorded on the disk face by the object lens 13. As for input signals, a digital-modulated high-definition image signal (HD signal) 20, a digital HD signal 30, an analog HD signal 40 are supplied from a terminal 201 (acceptance means for accepting digital-modulated signals), a terminal 301, and a terminal 401 (analog signal accepting means), respectively.

The digital-modulated HD signal 20 used in the present embodiment has been obtained by conducting modulation by using the 64 QAM method. The entire transmission rate of the digital signal is 24 Mbps, and the signals are transferred at a rate of 4 Mbaud. It is premised that this signal is transmitted as a broadcasting signal using a ground wave, and the carrier frequency at the time of transmission is at least 100 MHz. Immediately before the input stage, the signal is in the intermediate frequency state and the frequency is 70 MHz, for example, in the present embodiment. For recording the signal on the disk, the carrier frequency of this signal must be further dropped to approximately several MHz by using frequency conversion. In the present embodiment, a low carrier wave frequency of preferably, 5 MHz is obtained by using the frequency converter 22. Simultaneously at this time, the amplitude level is adjusted to become 0.5 Vpp.

The case of the digital HD signal 30 will now be described. The digital HD signal 30 has been obtained by compressing an HD baseband signal. The digital HD signal 30 is an original signal of the digital modulated signal. The transmission rate of the digital HD signal 30 is 24 Mbps. This means all signals including an error correction signal. This signal is subjected to digital modulation before it is recorded on the disk. In the same way as the case of transmission, the digital modulation method is 64 QAM. Before actually conducting digital modulation, the input signal must be converted to eight data because of 64 QAM. This conversion is conducted by a conventional serial-parallel converter circuit 32. By using this data, 64 QAM modulation is conducted in the QAM modulator 33. In this case, the carrier wave frequency modulated has been set at 5 MHz, for example, from the beginning. Therefore, the output of the QAM modulator 33 has completely the same form as the signal has in case a broadcasting signal is subjected to frequency conversion.

The case of the analog HD signal will now be described. As the analog HD signal, a MUSE signal, for example, is used. The MUSE signal is directly subjected to frequency modulation.

These three signals are changed over by the signal changeover unit 16 and inputted to a frequency modulator 15. The frequency modulator 15 has a center frequency of 12.5 MHz and deviation of 3.8 MHz. In case of the QAM signal, the frequency at the maximum amplitude value is 12.5 MHz±1.9 MHz. In case of the MUSE signal, the white level corresponds to 14.4 MHz and the black level corresponds to 10.6 MHz.

In case the recording signal is a QAM signal, the digital modulation reference signal generator 19 is added. The reference signal is needed when the QAM signal is to be demodulated. (If one digital bit includes a carrier wave containing at least one wavelength as a result of modulation, the reference signal need not be added. When the quantity of data is large, or the carrier wave frequency is low, at least one wavelength cannot be contained and hence the reference signal cannot be generated. In such a case, therefore, the reference signal is also recorded.) The frequency of the reference signal is decided to be a value having a predetermined relation with respect to the carrier wave frequency at the time of QAM modulation, which is 5 MHz in the present embodiment. In the present embodiment, the frequency of the reference signal is decided to be one fourth of 5 MHz, i.e., 1.25 MHz.

The reference signal in the present embodiment is recorded over the entire recording area. It is not always necessary to record the reference signal over the entire area.

Furthermore, it is not always necessary to apply the reference signal to the output obtained after frequency modulation. For example, it is also possible to apply a signal of 1.25 MHz before frequency modulation and conduct frequency modulation simultaneously.

Each of frequency-modulated signals is inputted to a laser drive circuit included in the optical unit 14. In accordance with the modulation signal, laser light is emitted. This frequency-modulated analog signal is focused on the disk by the object lens 13 and recorded.

FIG. 2 shows an example of a system configuration in case each high definition signal is to be recorded on the present disk. As described before by referring to FIG. 1, three kinds of signals can be inputted to the optical disk player 1 capable of recording and reproducing. First of all, a first signal is obtained by receiving, in the receiver 21, a digital modulation signal transmitted by a ground wave broadcasting 2 fed from the antenna 2 or by broadcasting using cable television. A signal 210 is a signal in such a state that they have been converted into the intermediate frequency. A second signal is a digital signal obtained by compressing, in a digital image signal coder 31, a baseband HD digital signal such as a signal fed from the digital VTR 3. Furthermore, a third signal is a signal of satellite broadcasting and it is a MUSE signal received by a satellite broadcasting receiver 41 via the antenna 4.

Figure 3:
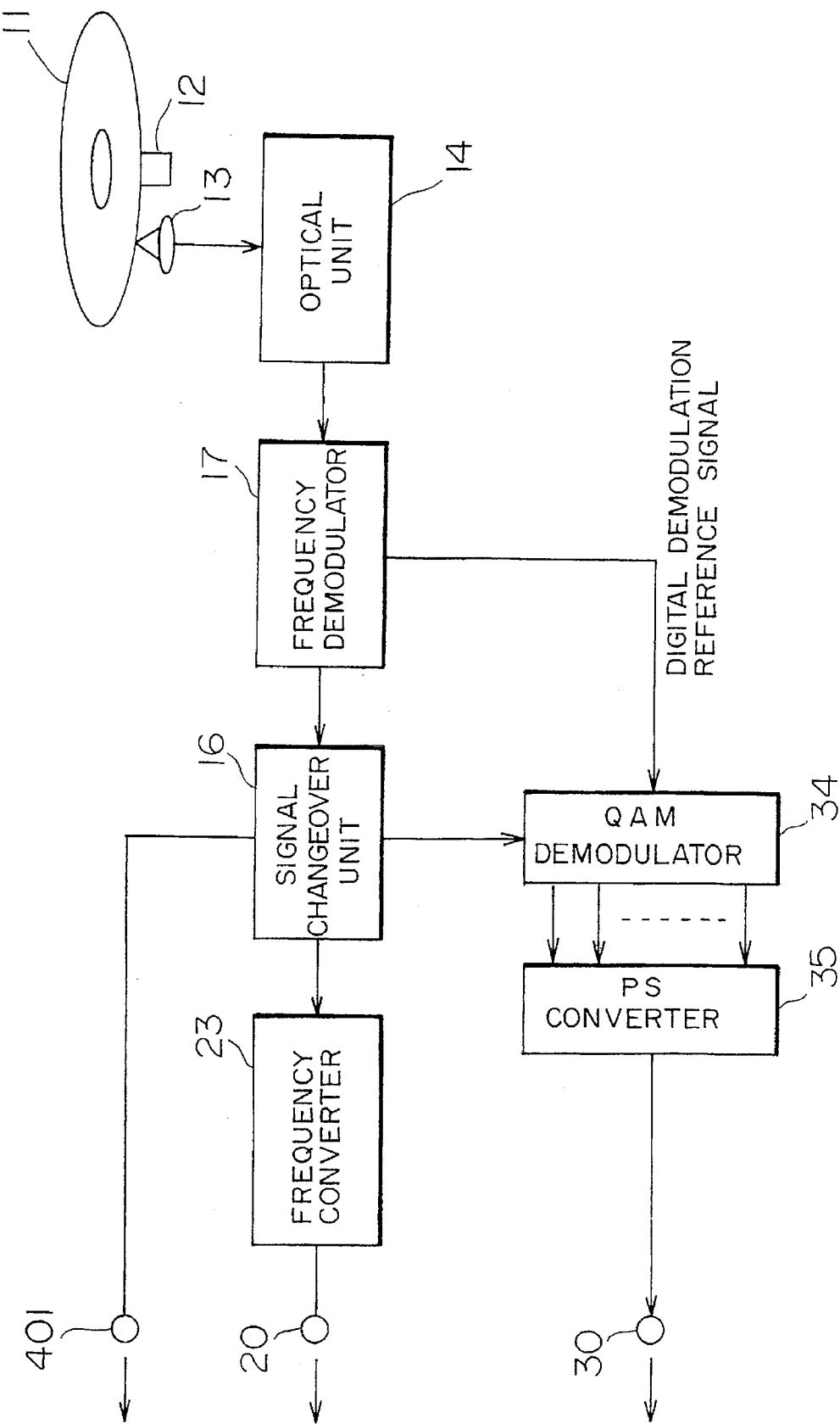
FIG. 3 is a block diagram of a portion of a reproducing system in the first embodiment, the portion being included in the player.
Figure 4:
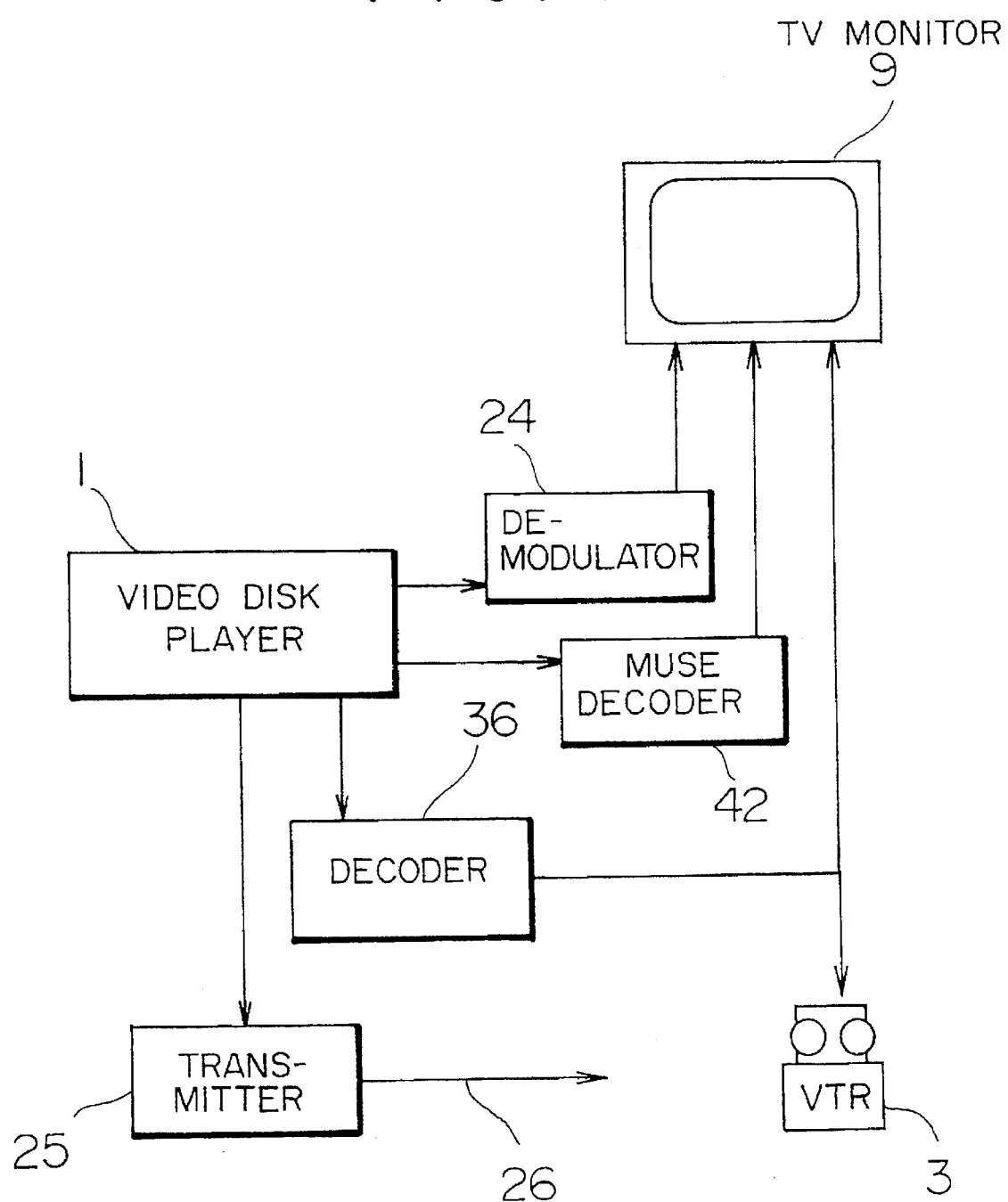
FIG. 4 is a block diagram of a reproducing system included in the recording/reproducing apparatus of the first embodiment.

A reproducing system of the present embodiment will now be described. FIG. 4 is a block diagram of the reproducing system included in the recording/reproducing apparatus. FIG. 3 is a block diagram of a portion of the reproducing system which is included in the player. The reproducing system has nearly the same configuration as the recording system has. The optical disk 11 is rotated by the spindle motor 12. Signals on the disk are read by laser light emitted from the optical unit 14 through the object lens 13. In the write-once optical disk (the disk of postscript type) used in the present embodiment, a reflectance difference is detected to obtain a signal in the same way as disks exclusively for reproduction. In the optical unit 14, a photodetector and an RF amplifier circuit are incorporated. Thereby, signals of the disk are converted to electric signals.

In contrast with recording, the signal read out is demodulated by a frequency demodulation circuit 17. Although the signal-to-noise ratio is somewhat degraded by recording and reproducing, nearly the same signal as the input signal is demodulated. In case a QAM signal has been recorded, a demodulation reference signal is extracted by a filter included in a demodulator and sent to a QAM demodulator 34. In the present system, the reference signal is one fourth of the original carrier wave in frequency. Therefore, the reference signal is quadrupled in frequency to obtain the carrier wave in digital modulation.

As for input signals, there are three kinds. As for the form of signals to be recorded, there are two kinds, i.e., the MUSE signal and the digital modulation signal. No matter whether the input signal at the time of recording is a digital-modulated signal or a digital signal, therefore, the signal recorded on the disk and then demodulated is a digital modulation signal having the same form, i.e., a 64 QAM signal with a carrier wave of 5 MHz and 4 Mbaud. Even if the input signal is a digital modulation signal, it doesn't matter if the demodulated and extracted signal is a digital signal. Even if a digital signal has been inputted and recorded, it is also possible to send it to a transmission system at the time of outputting as a QAM-modulated signal by conducting frequency conversion in such a direction as to raise the frequency in contrast with the time of inputting.

If a signal is extracted as a digital modulation signal and further sent to the transmission system, then the carrier wave frequency is made a higher frequency by a frequency converter 23, the amplitude characteristics are conformed to specifications of the transmission system, and a resultant signal is outputted. In case a signal is extracted as a digital signal, the signal is converted to 8-bit parallel data by the QAM demodulator 34 and extracted as serial data by a parallel-serial data converter 35.

On the other hand, the MUSE signal which is an analog signal is reproduced as an analog MUSE signal by only demodulation processing separately from the above described signals. At the time of reproducing as well, these signals are changed over to necessary positions and outputted by the signal changeover unit 16.

FIG. 4 shows a block diagram of them. Respective signals cannot be watched on a TV set as HD signals if they are left as they are. Therefore, converters conformed to respective signals are required.

A digital modulation signal is demodulated to a high definition image by a demodulator 24 exclusively for converting the digital modulation signal to an image. In case a digital modulation signal is sent to the transmission system, a transmitter 25 is required. Furthermore, in case of digital signal, a compressed signal is demodulated by using an image signal decoder 36 and it is reproduced on a television monitor as a high definition television signal (HDTV signal) or recorded into a VTR or the like.

In case of MUSE signal, it can be demodulated as an HD signal by a MUSE decoder 42 and watched on the TV monitor.

In the present embodiment, a digital signal is digital-modulated, or a digital-modulated signal is subjected to appropriate frequency conversion, subjected to frequency modulation, and recorded on the disk as an analog signal. As a result, multiplexed data can be recorded, and recording and reproduction with a higher density than conventional recording and recording for a long time become possible.

Furthermore, since both analog signals and digital signals can be recorded on the disk in nearly the same state, a common disk can be used and mixed presence of analog signals and digital signals in the same disk becomes also possible. Furthermore, it becomes easy to keep interchangeability with conventional video disks exclusively for reproduction having analog signals frequency-modulated and recorded thereon. By sharing an optical system and a mechanism system, therefore, all of the disk, optical parts, laser, and mechanism parts can be used in common, resulting in a higher efficiency.

Figure 5:
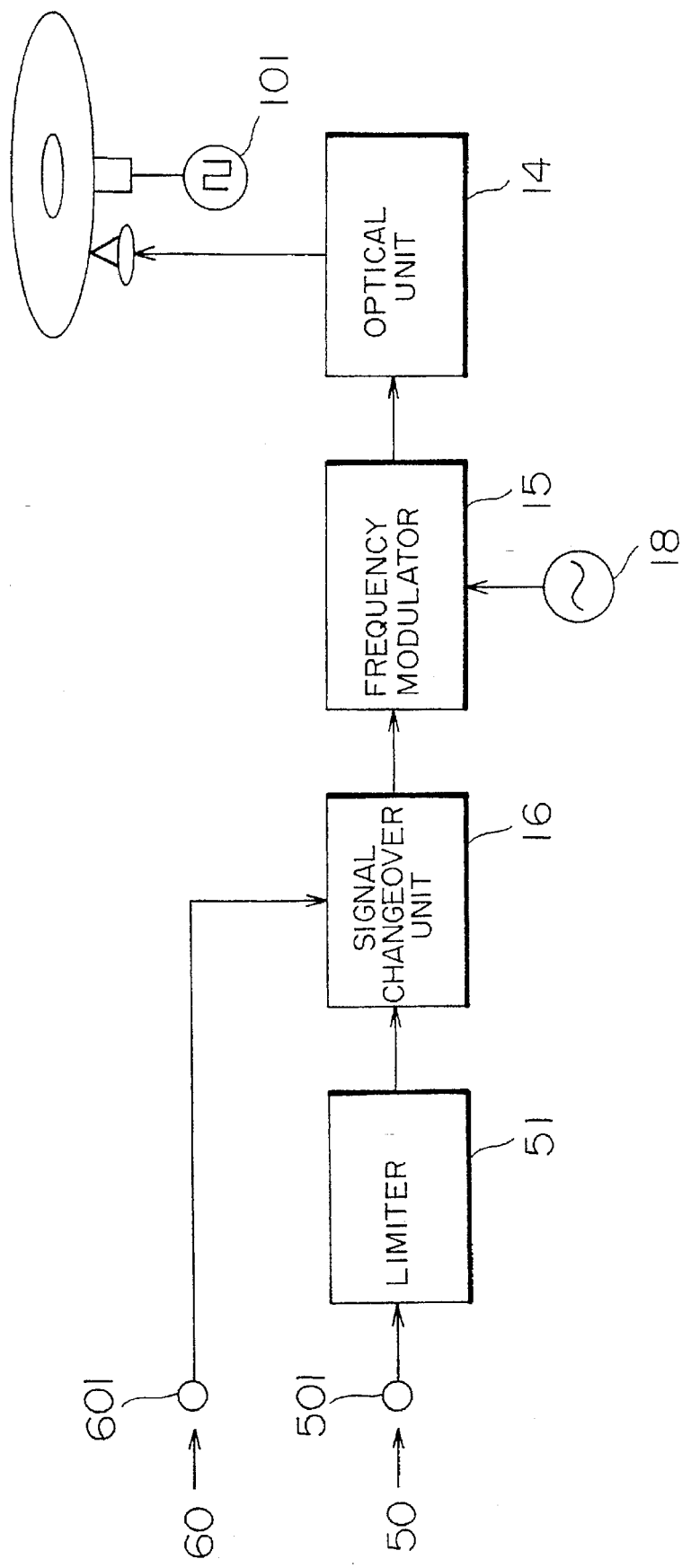
FIG. 5 is a block diagram of a portion of a recording system in the second embodiment, the portion being included in a player.

FIG. 5 shows another embodiment. FIG. 5 is a block diagram of a portion of a recording system of a recording/reproducing apparatus which is included in a player. Input signals are an NTSC analog signal 60 and a digitized and compressed NTSC digital signal 50. The input signals 60 and 50 are inputted from terminals 601 and 501, respectively. In a stage preceding the modulation, amplitude levels of the analog signal and the digital signal are made constant. At this time, the signal form is not changed especially. In the present embodiment, the amplitude level has been set at 1 Vpp. The analog signal is supplied with 1 Vpp and inputted to a modulator as it is. In case the digital signal is a signal having a magnitude other than 1 Vpp, the magnitude is changed to 1 Vpp.

On the basis of a reference carrier wave signal 18, the input signal is subjected to frequency modulation in a frequency modulator 15 in accordance with the level of the input signal. FIG. 7 shows frequency allocation. In case of analog signal, the white level is 9.3 MHz and the sync. tip located at the synchronization front end is 7.6 MHz. In case of digital signal, the high level (H) corresponding to 1 is modulated by 9.3 MHz and the low level (L) corresponding to 0 is modulated by 7.6 MHz.

Therefore, the modulator is used in common. Furthermore, the recorded and reproduced signals are also signals subjected to frequency modulation by a carrier wave and exhibit nearly the same frequency distribution.

Furthermore, rotation control at the time of recording is exercised by a rotation control signal 101 supplied to a spindle motor.

Figure 6:
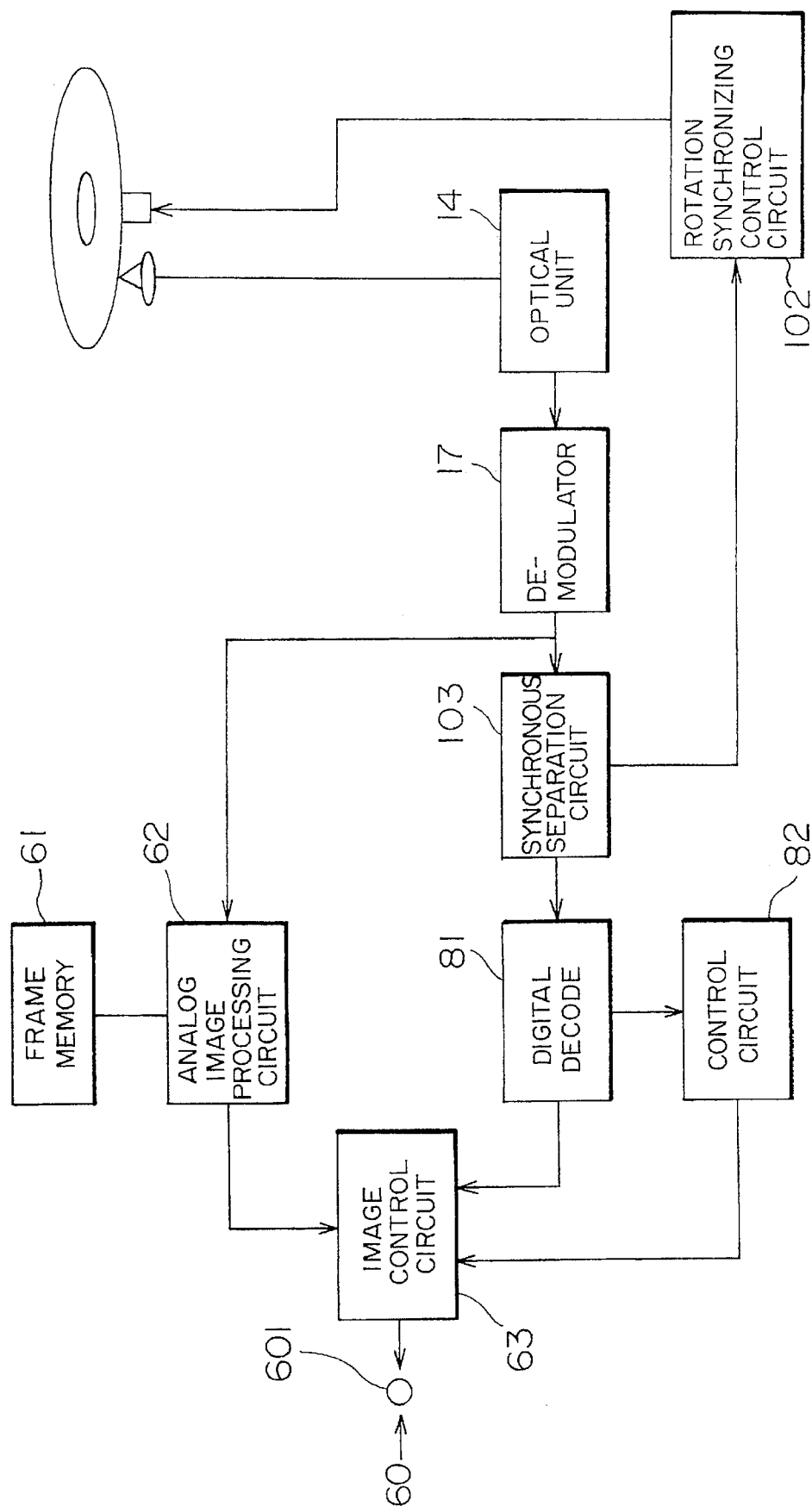
FIG. 6 is a block diagram of a portion of a reproducing system in the second embodiment, the portion being included in the player.

FIG. 6 is a block diagram of a portion of a recording system of the present recording/reproducing apparatus which is included in the player. The reproduced signal is converted to an electric signal by an optical unit 14 and demodulated to the original signal by a demodulator 17.

Figure 8:
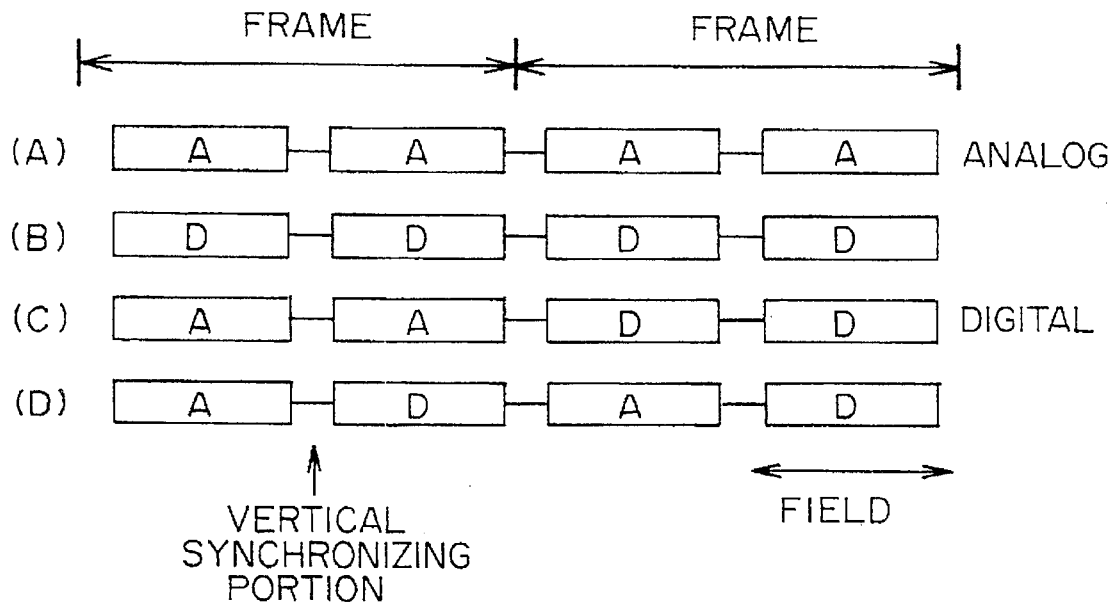
FIG. 8 is a diagram for explaining a signal recording format in the second embodiment.
Figure 9:
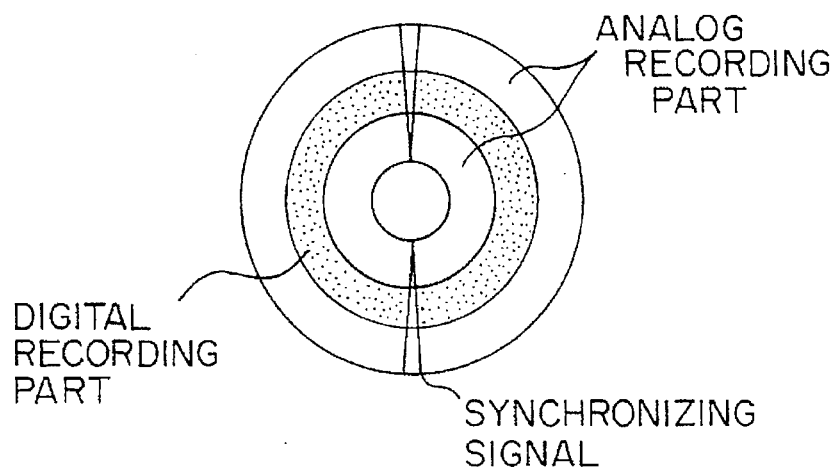
FIG. 9 is a diagram for explaining an example of signal recording in a system direction in the second embodiment.

In case a signal recorded on the disk is to be reproduced, the number of revolutions must be synchronized to the recording signal. In case of analog signals, a rotation synchronizing signal is taken out from a vertical synchronizing signal of a demodulated image signal. In the present embodiment, digital data are also provided with a format having a synchronizing signal and a rotation synchronizing signal is obtained therefrom. The synchronizing signals are shown in FIGS. 8 and 9. Out of the demodulated signal, only the synchronizing signal is extracted by a synchronous separation circuit 103 and sent to a rotation synchronization control circuit 102 to control the rotation of the spindle.

Out of the demodulated signal, the analog signal is sent to an analog image processing circuit 62. The analog processing circuit has a frame memory 61. In case of a digital-analog mixture signal, a complete image signal is produced in this portion. That is to say, in case there is a code, an image associated with the code is fetched from the frame memory 61 to make a complete image.

On the other hand, the digital signal is subjected to synchronous separation and thereafter decoded by a digital decode circuit 81. Thereby, it is remade as an NTSC image signal. In case of a control signal, it is sent to a control circuit 82 and processed as a signal other than an image. Out of the signals other than the image, the signal outputted to the screen as character information is sent to the output side again.

All of the analog image data, digital image data, and character signals such as letters are mixed in an image control circuit 63 and outputted as an NTSC image.

Arrangement of signals in the present embodiment will now be described by referring to FIGS. 8 and 9. FIG. 8 shows an example of signal arrangement with a field taken as the unit. In FIG. 8, A denotes an analog signal and D denotes a digital signal. In FIG. 8(a), all field signals are analog signals and a conventional laser disk corresponds to this. In FIG. 8(b), all field signals are digital data. In FIG. 8(c), data alternate between digital data and analog data every frame. In FIG. 8(d), data alternate between digital data and analog data every field. FIG. 9 shows an example of arrangement of data in the radial direction. In case of FIG. 9, analog data are stored in inner and outer parts whereas digital data are stored in an intermediate part. The present arrangement is an example, and the analog data and the digital data can be arranged freely. Although analog data are image data in the present embodiment, the digital data need not necessarily be compressed image data, but may be character data, audio data, control data, or data for computer.

Owing to such a data structure, it is possible to take an analog image of one frame, for example, into a memory, and then give explanation on the basis of digital data such as audio data contained in the next frame or send explanation in the form of multiplexed character information on the basis of control data. Furthermore, it is also possible to use such a data structure in a game or the like to conduct moving picture processing at high speed. Since in the present system digital data are recorded and reproduced at a high transfer rate, processing of a higher speed becomes possible as compared with the case where digital data are written into a low frequency part of the signal frequencies as in conventional disks. (Since a low frequency region is used, only a smaller amount of data can be written as compared with the case where a high frequency region is used.) Furthermore, in case images are outputted in the form of analog signals, images are outputted in real time. As compared with the conventional technique, therefore, there is an effect that waiting time until images are outputted is little felt.

In addition, the recording format of analog signals shown in the present embodiment is the same format as a laser disk exclusively for NTSC reproduction has, resulting in compatibility with a higher rank.

In the present embodiment, data alternate between analog data and digital data every field. Since in fact data are subjected to frequency modulation and then recorded, however, the recording/reproducing condition to/from the disk is nearly the same for both digital and analog data. At the time of recording/ reproducing, it is not necessary to care about changes in the optical system and the mechanism system. As for the disk as well, a disk designed for analog signals can be used as it is.

Figure 10:
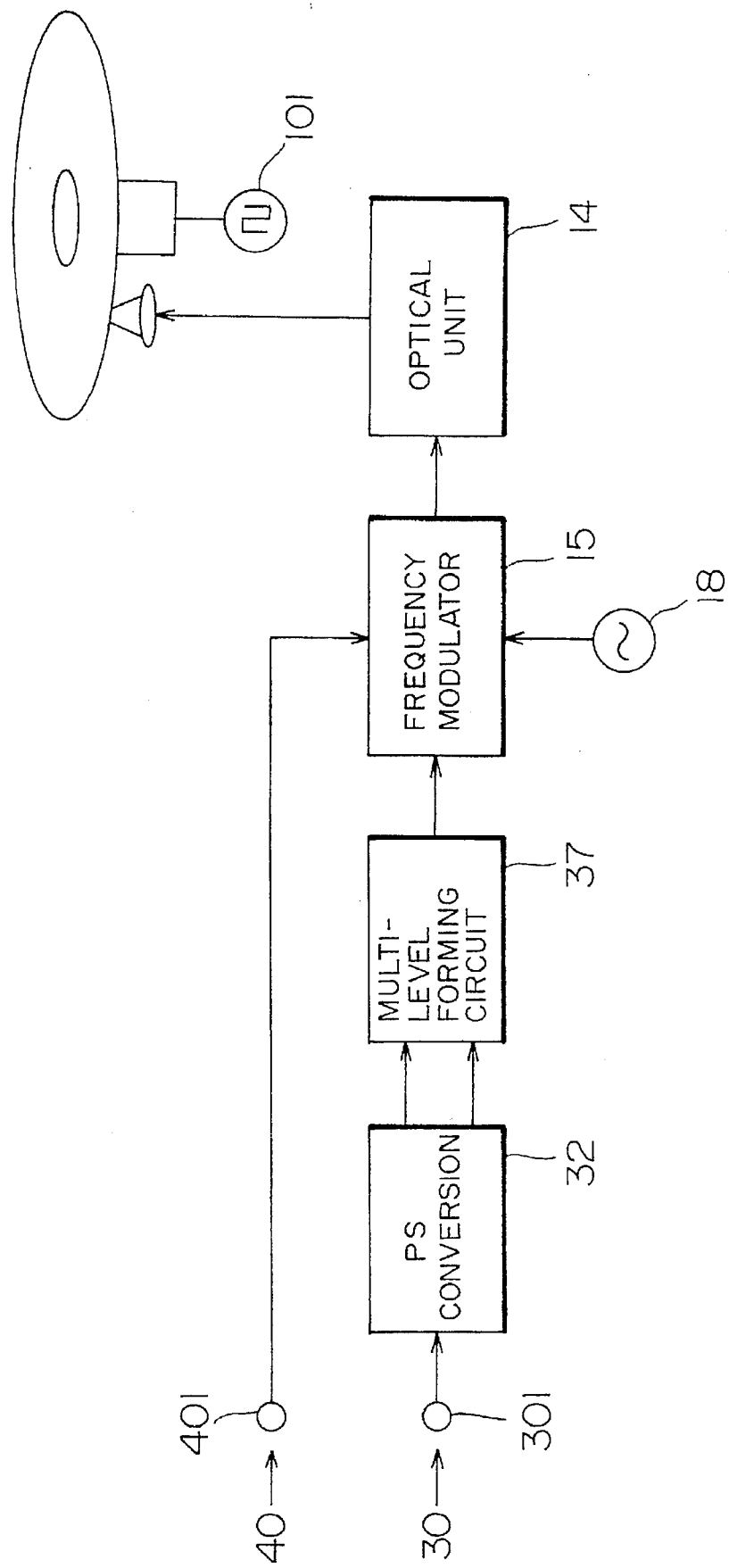
FIG. 10 is a block diagram of a portion of a recording system in a third embodiment, the portion being included in a player.

Another embodiment is shown in FIG. 10. FIG. 10 shows a block diagram of a portion of a recording system of a recording/reproducing apparatus which is included in a player. In the present embodiment, an example using the present invention in a system for recording/reproducing high definition (HD) images is shown. In the present embodiment, the MUSE signal used for High Vision transmission is employed as an example of analog signal of high definition images. Furthermore, as digital signals, four kinds of digital signal are used.

Inputted digital data has a rate of 24 Mbs and inputted from a digital signal input terminal 30. This is converted once to a two-bit signal by a parallel-serial converter circuit 32. The two-bit signal is converted to a quad-valued signal with 6 Mbaud by a multi-valued circuit 37. In the present embodiment, two-bit signals [00], [01], [10] and [11] are respectively associated with levels 0, 1, 2 and 3, resulting in a quad-valued signal. The quad-valued signal is inputted to a frequency modulator 15. In the frequency modulator 15, frequency modulation is conducted by using a reference carrier wave signal 18. The laser is driven by an optical unit 14 to conduct recording. On the other hand, the MUSE signal of the analog high-definition image is inputted directly to the frequency modulator 15.

Frequency allocation at the time of recording is shown in FIG. 12. In case of an analog input, it is subjected to frequency modulation so that the black level of luminance may be associated with 10.6 MHz and the white level may be associated with 14.4 MHz. On the other hand, a multi-level digital signal is modulated so that 0, 1, 2 and 3 may be associated with 10.6 MHz, 11.9 MHz, 13.1 MHz and 14.4 MHz, respectively.

Furthermore, rotation control at the time of recording is exercised by a rotation control signal 101 sent to the spindle motor.

Figure 11:
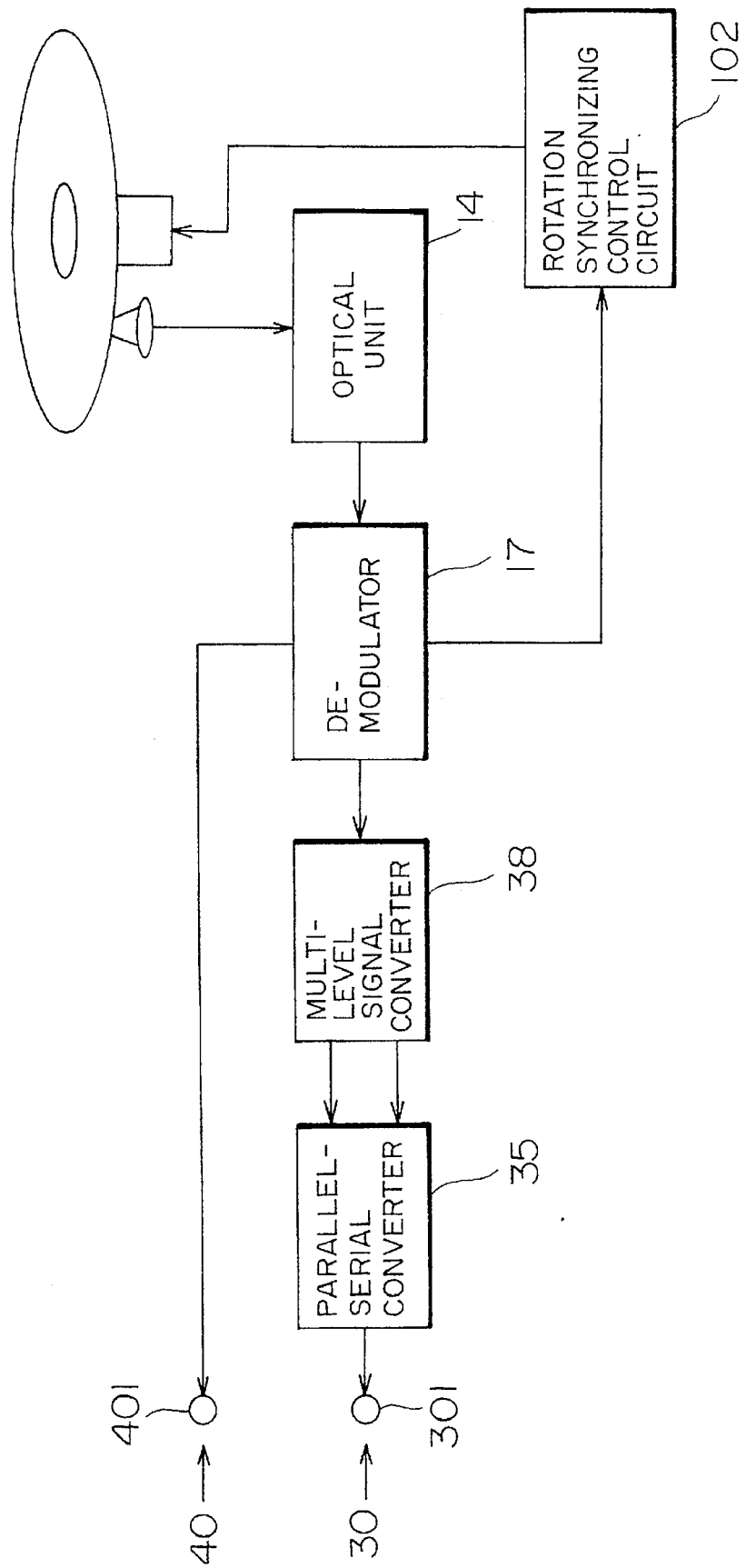
FIG. 11 is a block diagram of a portion of a reproducing system in the third embodiment, the portion being included in the player.

FIG. 11 shows a block diagram of a portion of a reproducing system which is included in the player. At the time of reproduction, a signal fed from the optical unit 14 is demodulated by a demodulator 17, converted to a digital quad-valued signal, and then converted to a two-bit digital signal by a multi-level signal converter 38. In the multi-level signal converter 38, the quad-valued signal is resolved into four values 0, 1, 2 and 3 by using threshold values. In contrast with the time of recording, each value is allocated to two bits, resulting in two-bit data. That is to say, [11] is yielded if the quad-valued signal is 3, and [10] is yielded if the quad-valued signal is 2. Furthermore, [01] is yielded if the quad-valued signal is 1, and [00] is yielded if the quad-valued signal is 0. This two-bit signal is converted to serial data by a parallel-serial converter 35 and outputted.

In case analog MUSE signals have been recorded, a MUSE signal is outputted from the demodulator 17.

Furthermore, in the present embodiment, a pilot signal is used as means for attaining rotation synchronizing. On the disk, a pilot signal for attaining rotation synchronizing is added besides signals as shown in FIG. 12. In the present embodiment, this pilot signal is recorded also when digital data are recorded, and synchronizing is attained thereby. The pilot signal is extracted from a signal demodulated by the demodulator 17. The pilot signal thus extracted controls the spindle motor via a rotation synchronizing control circuit 102 so as to make the rotation constant.

Figure 13A:
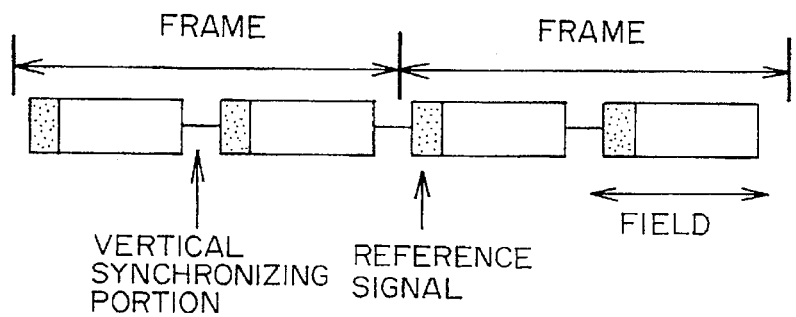
FIGS. 13A through 13E are diagrams for explaining a multi-level demodulation reference signal in the third embodiment.
Figure 13B:
Figure 13C:
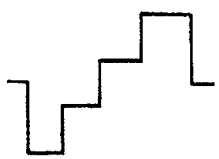
Figure 13D:
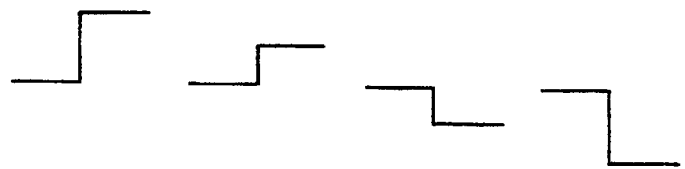
Figure 13E:
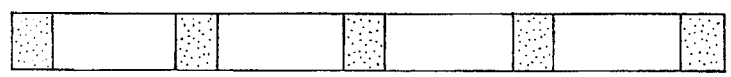

When a multi-level signal is demodulated, error occurrence rate becomes large if the level often changes due to noise or the like. In order to absorb an error caused by a level change, therefore, it is effective to provide a signal serving as a reference for multiple values. FIGS. 13A through 13E show multi-valued demodulation reference signals used in the present embodiment. FIG. 13B shows an example in which one of multiple values is applied as a reference signal. In this example, the highest level 3 among four values is used as the reference. FIG. 13C shows an example of the case where all of the four values are arranged in a predetermined pattern and are used as the reference. In one place, four values are arranged on steps b 0, 1, 2and 3. FIG. 13D shows the case where respective values are successively arranged one by one. In any of FIGS. 13B, 13C and 13D, a reference level is placed immediately after a synchronizing signal. In the present embodiment, however, the synchronizing signal is not necessarily needed. As shown in FIG. 13E, therefore, it is possible to place a reference signal having a certain pattern, which is a step signal in this case, in a certain part of consecutive data.

Figure 14:
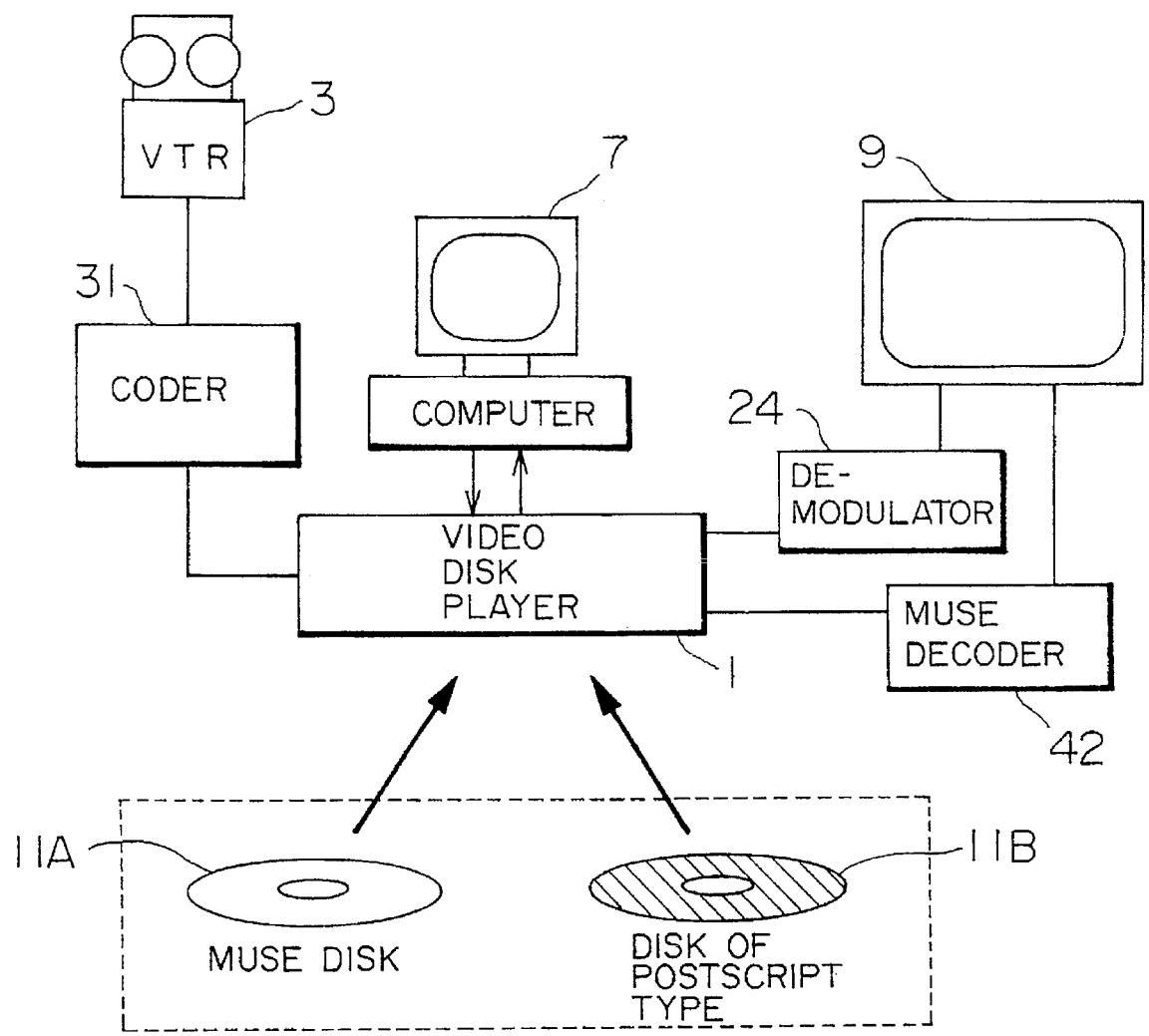
FIG. 14 is a block diagram of a recording/reproducing apparatus in the third embodiment.

FIG. 14 shows a block diagram of a recording/reproducing apparatus using the present embodiment. In the present embodiment, inputting and outputting of high definition images outputted from a computer are especially handled. Typical digital high definition image data are obtained by coding the data of a digital HD VTR 3 in a digital image signal encoder 31. In this case, the digital high definition image data is are compressed image signals with 24 Mbps. The digital high definition image data are inputted to a player 1. Furthermore, digital high definition image data stored in an external computer 7 are also processed in the computer 7 to become digital data of 24 Mbps having the same format as the above described signal has and are recorded/reproduced by the player 1. The compressed image signal of 24 Mbps and the digital high definition image data stored in the computer 7 are changed over or combined to be inputted as the signal 30 of FIG. 10.

As an optical disk capable of operating in the optical disk player 1, two kinds of optical disk, i.e., a MUSE disk exclusively for reproduction 11a and a write-once optical disk (an optical disk of postscript type) 11b can be used in the player. As the write-once optical disk 11b, a disk of $Sb_2Se_3/Bi$ is used. This disk is used because a high C/N is obtained. The disk to be used is not limited to this, but rewritable disks using phase change and optical magnetism may also be used.

The recording format of MUSE signals and the format of the pilot signal in the present embodiment are the same formats as a MUSE disk exclusively for reproduction has. The high rank compatibility with disks exclusively for reproduction is thus maintained.

In the present embodiment, quadruple values have been used as multiple values. However, this depends upon the performance of the disk, and this is not limited to quadruple values. Furthermore, although a MUSE signal has been used as an analog signal in the present embodiment, the analog signal is not especially limited to a MUSE signal.

According to the present embodiment, multi-level digital data are recorded by using the frequency modulation method. As a result, recording with a higher density becomes possible and high definition digital image data can be recorded for a long time. Furthermore, since recording is performed by employing a frequency modulation method using the same carrier wave as the conventional analog recording uses, interchange with a MUSE disk exclusively for reproduction is facilitated.

We claim:

1. A recording apparatus comprising:

analog signal input means for inputting an analog signal to said recording apparatus;

first digital signal input means for inputting a first modulated digital signal to said recording apparatus;

second digital signal input means for inputting a digital signal to said recording apparatus;

a frequency converter for converting a frequency of said first modulated digital signal;

digital modulation means for conducting digital modulation on said digital signal to generate a second digital signal;

a signal switching unit for receiving said analog signal, said first digital signal, and said second digital signal as input signals thereof, and for outputting at least one of said analog signal, said first modulated digital signal, and said digital signal as a recording signal;

a frequency modulator for conducting frequency modulation on said recording signal; and recording means for recording said frequency-modulated recording signal on a recording medium.

2. A recording method comprising the steps of:

inputting an analog signal, a first modulated digital signal, and a digital signal;

converting a frequency of said first modulated digital signal;

conducting digital modulation on said digital signal and thereby generating a second digital signal;

selecting at least one out of said analog signal, said first modulated digital signal, and said second digital signal as a recording signal;

conducting frequency modulation on said recording signal; and recording said frequency-modulated recording signal on a recording medium.

* * * * *